(12) United States Patent
Whiteaker

(10) Patent No.: US 9,535,258 B1
(45) Date of Patent: Jan. 3, 2017

(54) METHOD AND APPARATUS FOR CORRECTING CHROMATIC ABERRATIONS IN A TELESCOPE

(71) Applicant: Ball Aerospace & Technologies Corp., Boulder, CO (US)

(72) Inventor: Kevin L. Whiteaker, Erie, CO (US)

(73) Assignee: Ball Aerospace & Technologies Corp., Boulder, CO (US)

( * ) Notice: Subject to any disclaimer, the term of this patent is extended or adjusted under 35 U.S.C. 154(b) by 78 days.

(21) Appl. No.: 14/575,909

(22) Filed: Dec. 18, 2014

Related U.S. Application Data

(60) Provisional application No. 61/921,908, filed on Dec. 30, 2013.

(51) Int. Cl.
  *G02B 23/06* (2006.01)
  *G02B 27/42* (2006.01)
  *G02B 17/08* (2006.01)

(52) U.S. Cl.
  CPC ....... *G02B 27/4211* (2013.01); *G02B 17/0808* (2013.01); *G02B 23/06* (2013.01); *G02B 27/4272* (2013.01)

(58) Field of Classification Search
  CPC . G02B 27/4211; G02B 17/0808; G02B 23/06; G02B 27/4272
  USPC .................. 359/364–366, 558–576
  See application file for complete search history.

(56) References Cited

U.S. PATENT DOCUMENTS

| | | | | |
|---|---|---|---|---|
| 4,550,973 A * | 11/1985 | Hufnagel | ................. | G02B 5/32 359/19 |
| 4,977,560 A * | 12/1990 | Wantuck | ............... | H01S 3/0903 372/102 |
| 5,287,218 A * | 2/1994 | Chen | ................... | G02B 17/0812 359/365 |
| 5,973,827 A * | 10/1999 | Chipper | ............... | G02B 5/1809 359/16 |
| 6,134,366 A * | 10/2000 | Loeb | ................. | C03B 37/01413 385/123 |
| 6,426,834 B1 * | 7/2002 | Braunecker | ........ | G02B 17/0832 359/366 |
| 6,487,342 B1 * | 11/2002 | Wu | ..................... | G02B 6/29349 385/23 |
| 6,707,603 B2 * | 3/2004 | Ansley | ............... | G02B 27/0025 359/366 |
| 6,888,613 B2 * | 5/2005 | Robins | ...................... | G02F 1/29 349/201 |
| 7,672,527 B2 | 3/2010 | Arenberg et al. | | |

(Continued)

OTHER PUBLICATIONS

Anderson et al. "Photon Sieve Telescope," Proceedings of SPIE, Jun. 2006, vol. 6265, 626523, 8 pages.

(Continued)

*Primary Examiner* — Frank Font
(74) *Attorney, Agent, or Firm* — Sheridan Ross P.C.

(57) ABSTRACT

Methods and systems for correcting chromatic aberrations in a telescope incorporating a diffractive primary optical element are provided. In particular, a corrective optic assembly that includes a corrector diffractive optical element (DOE) is described. The corrective optic assembly provides light to the corrector DOE at a high incidence angle. Moreover, light is reflected from the corrector DOE at a high exit angle comprising a cylindrical Littrow configuration allowing for greater bandwidth and smaller size.

20 Claims, 6 Drawing Sheets

(56) References Cited

U.S. PATENT DOCUMENTS

| | | | | |
|---|---|---|---|---|
| 2002/0071472 A1* | 6/2002 | Dickson | ............... | G02B 5/32 |
| | | | | 372/102 |
| 2002/0158131 A1* | 10/2002 | Dickson | ............ | G02B 5/1842 |
| | | | | 235/462.34 |
| 2003/0206338 A1* | 11/2003 | Cook | ............. | G02B 17/0804 |
| | | | | 359/356 |

OTHER PUBLICATIONS

Hansen "Developing Lightweight Optics for Space," Science & Technology Review, Jan./Feb. 2013, 4 pages.
Meinel et al. "Large membrane space optics: imagery and aberrations of diffractive and holographic achromatized optical elements of high diffraction order," Optical Engineering, Aug. 2002, vol. 41, No. 8, pp. 1995-2007.
U.S. Appl. No. 14/542,207, filed Nov. 14, 2014, assigned to Ball Aerospace & Technologies Corp.
U.S. Appl. No. 14/587,342, filed Dec. 31, 2014, assigned to Ball Aerospace & Technologies Corp.

\* cited by examiner

METHOD AND APPARATUS FOR CORRECTING CHROMATIC ABERRATIONS IN A TELESCOPE

CROSS-REFERENCE TO RELATED APPLICATIONS

This application claims the benefit of U.S. Provisional Patent Application Ser. No. 61/921,908, filed Dec. 30, 2013, the entire disclosure of which is hereby incorporated herein by reference.

STATEMENT REGARDING FEDERALLY SPONSORED RESEARCH OR DEVELOPMENT

This invention was made with government support and under agreement number HR 0011-10-C-0157 awarded by DARPA. The government has certain rights in the invention.

FIELD

Methods and systems for correcting chromatic aberrations in a telescope are provided.

BACKGROUND

Large aperture, space-based telescopes can benefit from the use of a transmissive diffractive optic as the primary collecting element. For example, such elements are advantageous in terms of mass efficiency and stowed size for launch vehicle integration. However, the dispersion of light wavelengths (i.e. chromatic aberrations) by the diffractive primary optical element must be corrected by a secondary diffractive optic if the telescope is to be used in a broad-band imaging application.

The correction of chromatic effects can be performed in various ways. For example, systems that correct chromatic effects from a Fresnel lens by collecting data at multiple detectors arrayed along the optical axis, and then digitally processing the data to obtain composite, multi-color images, or spectral-selected images, have been described. However, because relatively little light is typically available, such an approach would suffer from negative effects caused by noise in the detectors. In addition, significant processing power would be required.

The use of a corrector diffractive optical element has also been discussed. However, and particularly in a space-based telescope, it is desirable to minimize the size and mass of the corrective optic. Achieving correction of chromatic dispersion using a relatively small and low mass assembly has been difficult. In particular, such systems have required relatively large structures because they would include a very small angle of incidence at a connector element and a large exit angle.

SUMMARY

Embodiments of the present disclosure are directed to solving these and other problems and disadvantages of the prior art. A system or apparatus in accordance with embodiments of the present disclosure includes a telescope incorporating a diffractive primary optical element. The diffractive primary optical element may in the form of a blaze type multiple order diffraction grating that produces multiple diffraction orders. A corrector diffractive optical element is provided to correct the chromatic dispersion created by the diffractive primary optical element. The corrector diffractive optical element may be in the form of a blaze type multiple order diffraction grating that produces multiple diffraction orders. The corrector diffractive optical element is configured to receive light at a high incidence angle, and to reflect and diffract at least some of the received light at a high exit angle allowing greater bandwidth and smaller size of corrector diffractive optical element.

In accordance with further embodiments of the present disclosure, an aft optical assembly is provided. The aft optical assembly can include a first convex mirror that is configured to reflect light diffracted by the primary optical element to a first concave mirror. The first concave mirror can, in turn, reflect light to the corrector diffractive optical element at a high incidence angle. The corrector diffractive optical element can be configured to reverse chromatic aberrations in the image that have been introduced by the diffractive primary optical element, and can do so across multiple diffraction orders. Moreover, the bandwidth of the chromatic correction provided at each diffractive order is proportional to the wavelength of the respective diffraction order. The corrector diffractive optical element is thus configured to correct chromatic aberrations in the light by providing a reverse diffractive power. In addition, the corrector diffractive optical element is configured to reflect the light back to the first concave mirror at a high exit angle. In accordance with embodiments of the present disclosure, the first convex mirror, the first concave mirror, and the corrector diffractive optical element are arranged in a cylindrical Littrow configuration. In accordance with further embodiments, the convex and concave mirrors are arranged in a double-pass Schwarzschild re-imager configuration. In accordance with still further embodiments of the present disclosure, the telescope can include Cassegrain condenser mirrors.

Additional features and advantages of embodiments of the present disclosure will become more readily apparent from the following description, particularly when taken together with the coming drawings.

DETAILED DESCRIPTION

Figure 1:
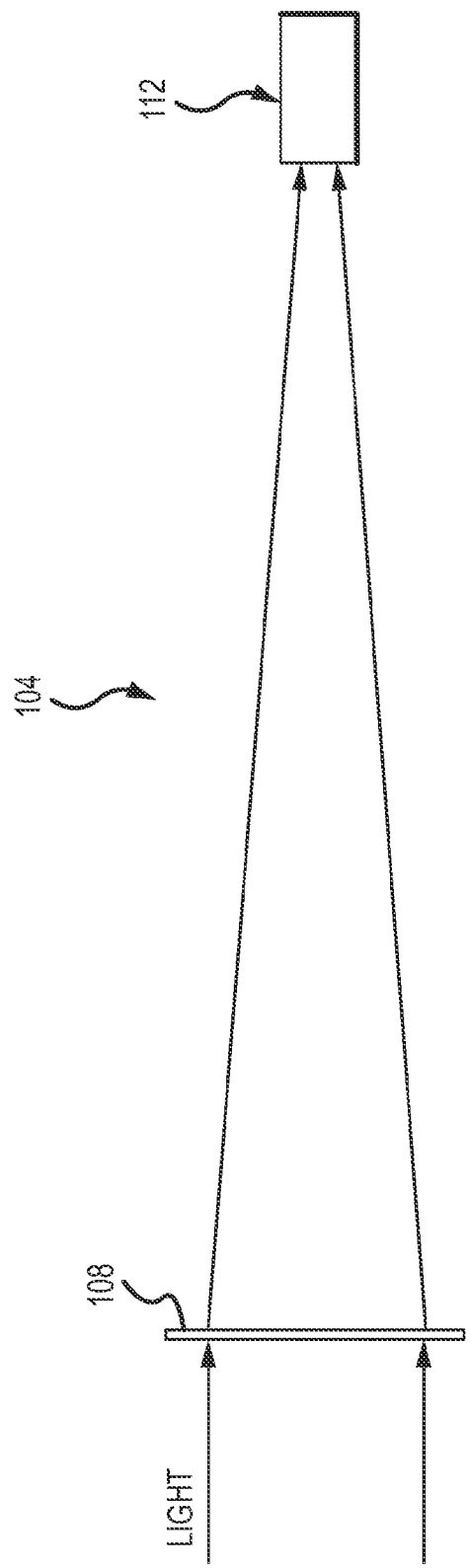
FIG. 1 depicts a space-deployed telescope incorporating a diffractive primary optical element and an aft optical assembly incorporating a corrector diffractive optical element in accordance with embodiments of the present disclosure.

FIG. 1 depicts a space-deployed telescope 104 incorporating a diffractive primary optical element 108 and an aft optical assembly 112 incorporating a corrector diffractive optical element in accordance with embodiments of the present disclosure. More particularly, the diffractive primary optical element 108 may comprise a transmissive diffractive optic, operating as a collecting element. In accordance with embodiments of the present disclosure, the diffractive primary optical element 108 may be formed from a plurality of sections, and may include a central obscuration. Moreover, the diffractive primary optical element 108 may employ phase diffraction or amplitude diffraction, and may include a concentric pattern of diffractive elements. For instance, the diffractive primary optical element 108 may include a blaze type multiple order diffraction grating with multiple concentric grating patterns that delivers light having an integer number of diffraction orders to the aft optical assembly 112. As can be appreciated by one of skill in the art, a transmissive diffractive optic has various advantages as compared to a reflective or refractive optic. However, one disadvantage is that the dispersion of light wavelengths (chromatic aberrations) by the diffractive primary optical element 108 must be corrected by a secondary diffractive optic if the telescope 104 is to be used for broad-band imaging. Embodiments of the present disclosure provide a corrector diffractive optical element as part of the aft optical assembly 112.

Figure 2:
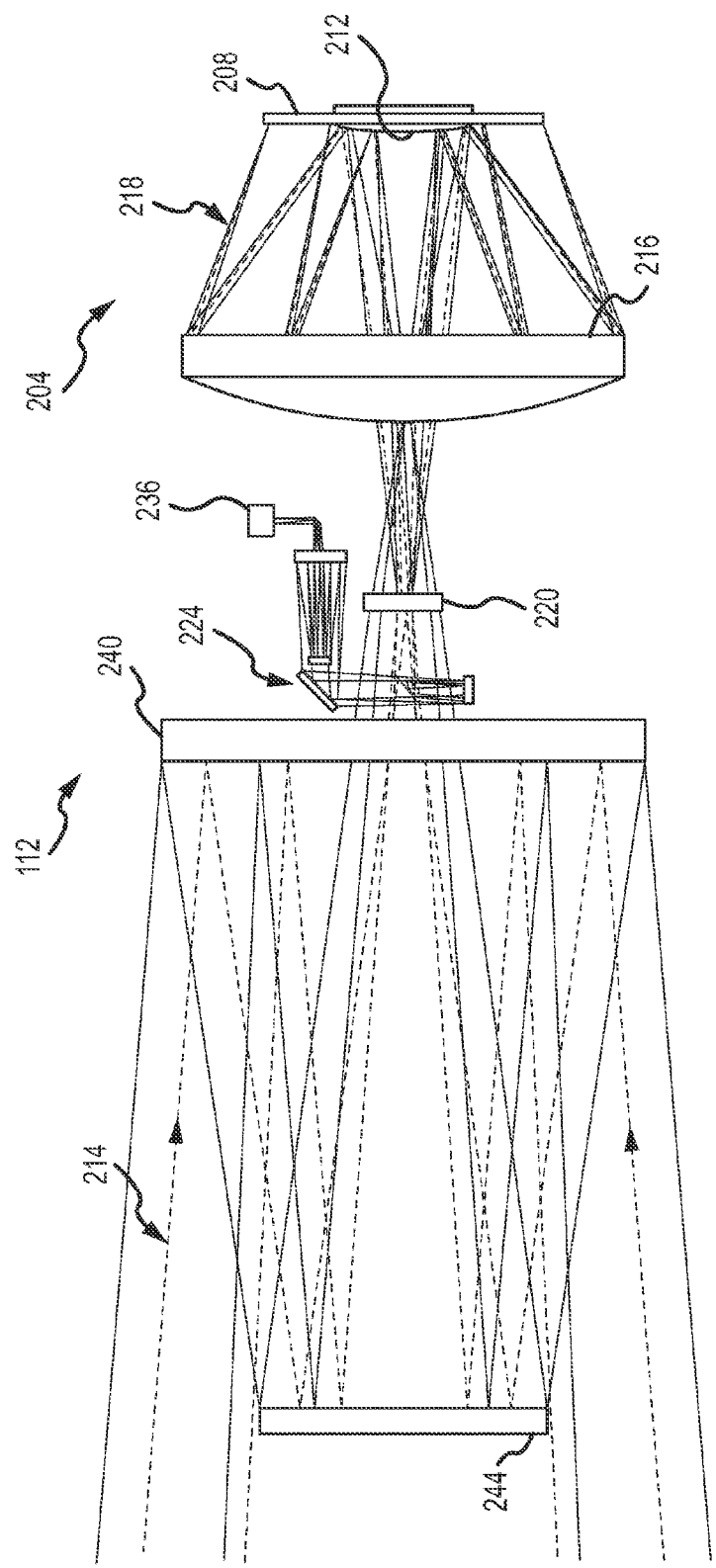
FIG. 2 depicts an aft optical assembly incorporating a corrector diffractive optical element in accordance with embodiments of the present disclosure, in a side view.
Figure 3:
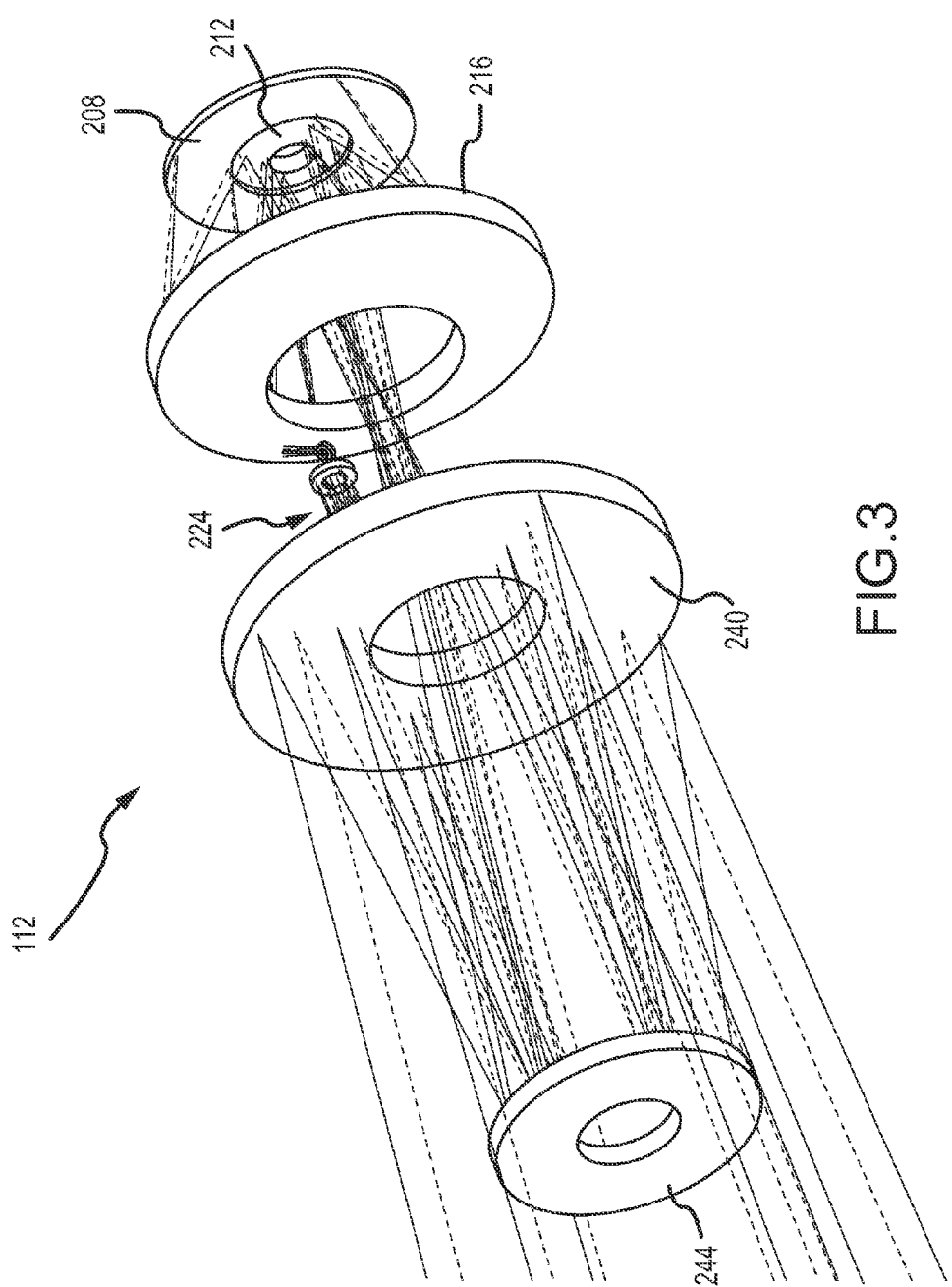
FIG. 3 depicts an aft optical assembly incorporating a corrector diffractive optical element in accordance with embodiments of the present disclosure, in a perspective view.
Figure 4:
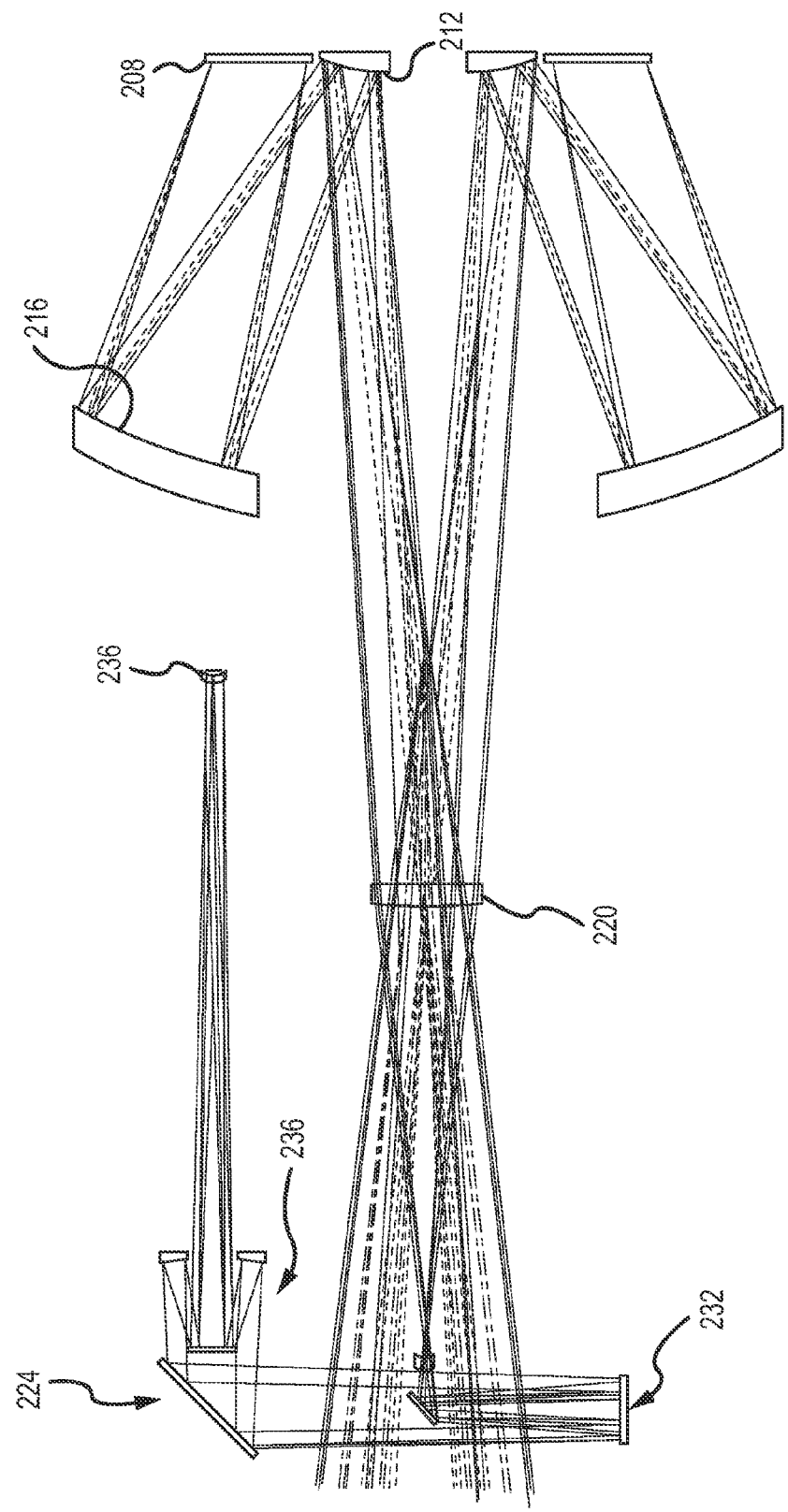
FIG. 4 depicts an aft optical assembly incorporating a corrector diffractive optical element in accordance with other embodiments of the present disclosure.

FIGS. 2-4 depict components of an aft optical assembly 112 that includes a corrective optic assembly 204 incorporating a corrector diffractive optical element (DOE) 208 in accordance with various embodiments of the present disclosure. More particularly, the corrective optic assembly 204 includes a first convex mirror 212, and a first concave mirror 216. As best seen in FIGS. 3 and 4, the corrector DOE 208 can be an annular element, and the first convex mirror 212 can be located within the open center section of the corrector DOE 208. In general, light 214 that has been diffracted by the primary optical element 108 is received at the first convex mirror 212. As can be appreciated by one of skill in the art, the light 214 that has been diffracted by the primary optical element 108 will have chromatic aberrations due to the diffraction of that light. The first convex mirror 212 reflects the received light to the first concave mirror 216. The first concave mirror 216 in turn reflects the light to the corrector DOE 208. Moreover, the light is received at the corrector DOE 208 at a high angle of incidence, for example between about 25° to 45° from a line normal to the surface of the corrector DOE 208 for the marginal rays. In accordance with further embodiments, the light is received at the corrector DOE 208 at an angle of incidence that is about 30° (i.e., ±10%) from a line normal to the surface of the corrector DOE for the marginal rays.

As can be appreciated by one of skill in the art after consideration of the present disclosure, the provided corrector DOE has a diffraction power that is the reverse of the diffractive primary optical element 108, in order to reduce or eliminate the chromatic aberrations introduced by the diffractive primary optical element 108. The corrector DOE 208 is thus configured to impart a negative power in order to produce negative dispersion. Accordingly, the corrector DOE 208 corrects the dispersion of light wavelengths introduced by the primary optical element 108. The corrector DOE 208 may comprise a reflective element. Moreover, the corrector DOE 208 may comprise a multiple order diffraction grating. The corrector DOE 208 may further comprise a blazed type multiple order diffraction grating with the grating elements arranged in a plurality of concentric patterns. Moreover, the corrector DOE 208 may be operable over an integer number of diffraction orders. The bandwidth of the chromatic correction provided by the corrector 208 at each of the diffraction orders is proportional to the wavelength at each of the diffraction orders. The corrector DOE 208 reflects the now chromatically corrected light 218 back to the first concave mirror 216. The angle of the light reflected back to the first concave mirror 216 is slightly higher than the angle at which the light was received. Other configurations could allow the light to be reflected back to the first concave mirror 216 at slightly lower angle than the angle received by the corrector DOE 208. Accordingly, the corrector DOE 208 and the first concave mirror 216 may be in a Littrow configuration, with the incident angle of light (e.g., a ray of light) received at the corrector DOE 208 nearly the same (e.g., within about 1-3 degrees) as the exit angle of light (e.g., the ray of light) reflected by the corrector DOE 208. For example, in accordance with at least some embodiments of the present invention, if the angle of incidence of a ray of light is 30° from a line normal to the surface of the corrector DOE 208, the exit angle of that light will be from 31° to 33° from the line normal to the surface of the corrector DOE 208. In addition, the light can double-pass through part of the pupil relay optics 212, 216 and 220, allowing for a relatively compact assembly. The first convex mirror 212 then reflects the now chromatically corrected light 218 to pick-off optics 224 associated with a receiver 236. This arrangement, including but not limited to the inclusion of the corrector DOE 204 in a Littrow configuration, provides effective chromatic correction in a relatively compact assembly.

The pick-off optics 224 are forward of the caustic light region where the incoming light is spread out from chromatic aberrations caused by the primary optical element 108. Another possible configuration is where the pick-off optics 224 are behind the caustic light region. Another possible configuration but with lower performance is where the pick-off optics 224 are within the caustic light region, where some vignetting of the light rays occurs across the bandwidth. The pick-off optics 224, as shown in FIG. 4, can include one or more lenses 228, and a plurality of reimaging mirrors 232 and 236, for example in a Ritchey-Chrétien configuration. The receiver 236 may comprise a focal plane array.

In accordance with at least some embodiments, the telescope 104 can include a Cassegrain condenser that includes a second concave mirror 240 and a second convex mirror 244. At least the second concave mirror 240 is annular, to allow light reflected by the second convex mirror 244 to pass through the second concave mirror 240 to the pupil relay lens optics 220, and on to the first convex mirror 212, the first concave mirror 216, and the corrector DOE 208. The condenser mirrors 240 and 244 allow the light diffracted by the telescope primary 108 to be collected and magnified, and allow the pupil relay optics to be of relatively small size and provide an overall assembly that is relatively small.

Light received at a telescope 104 in accordance with embodiments of the present invention is first diffracted by the primary optical element 108. At least some of the light 214 diffracted by the primary optical element 108 is received at the aft optical assembly 112. In particular, that light 214 can be received at the second concave mirror 240, and reflected towards the second convex mirror 244. The second convex mirror 244 can be located within the central obscuration region of the primary optical element 108. The second convex mirror 244 directs the light it receives from the second concave mirror 240 through the central obscuration of the second concave mirror 240, through relay lens optics 220, which in turn passes the light to the first convex mirror 212. The first convex mirror 212 reflects the light it receives from the relay lens optics 220 to the first concave mirror 216.

That light is reflected by the first concave mirror 216 to the corrector DOE 208. The corrector DOE 208 diffracts and reflects the received light. In particular, the amount of diffraction introduced by the corrector DOE 208 is selected to correct for the chromatic aberrations introduced by the diffractive primary optical element 108. Accordingly, the diffraction imparted by the corrector DOE 208 may be a negative dispersion and power to reverse the chromatic dispersion introduced by at least the primary optical element 108. In addition, the light is received at the corrector DOE 208 at a relatively high incidence angle, which enhances the chromatic correction power of the corrector DOE 208. The chromatically corrected light 208 is reflected back to the first concave mirror 216, at a relatively high exit angle that is close to but not the same as the angle at which light is received from the first concave mirror 216. Accordingly, the corrective optic assembly 204 has a cylindrical Littrow configuration. The light received at the first concave mirror 216 from the corrector DOE 208 is reflected back to the first convex mirror 212, and from there back through the relay lens optics 220. The relay lens optics 220 in turn directs the light to the pick-off optics 224. The pick-off optics 224 can then direct the light to a focal plane array, and/or other receive elements 236.

As can be appreciated by one of skill in the art after consideration of the present disclosure, this configuration can provide relatively powerful correction of chromatic aberrations. However, this configuration can also create relatively high spherical aberrations. Therefore, provisions should generally be made in the corrective optic assembly 204 or in optical assemblies that are located before or after the optic assembly 204 within the optical train to correct for such spherical aberrations. Accordingly, embodiments of the present disclosure may provide optical correction of both chromatic and spherical aberrations prior to delivering a corrected image to a focal plan array or other receiving device 236. In accordance with still other embodiments, spherical aberrations can be addressed in the digital domain during post-processing operations.

Figure 5:
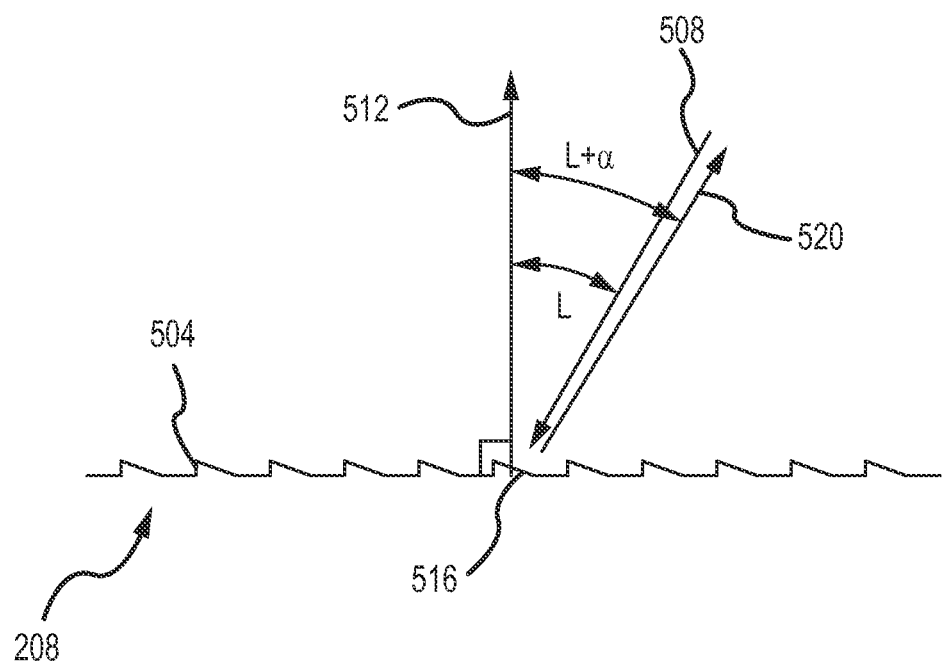
FIG. 5 depicts a surface of a corrector diffractive optical element in accordance with embodiments of the present disclosure.

FIG. 5 depicts a portion of a surface 504 of a corrector DOE 208 in accordance with an exemplary embodiment of the present disclosure in cross section. In this example, the corrector DOE 208 includes a plurality of blazed grating elements 506. The elements 506 may, when considered in plan view, be arranged concentrically about a center point. As shown, an incident ray of light 508 is at an angle L with respect to a line 512 that is normal to the surface 504 of the corrector DOE 208 at a point of incidence 516. The exit ray 520 (which generally comprises chromatically corrected light 218) is reflected from the point of incidence 516 at an angle L+α. As an example, for a marginal ray of light incident on the corrector DOE 208, L is from 25 degrees to 45 degrees, and α is from 0.5 degree to 5 degrees. As a further example, L is from 30 degrees to 40 degrees, and α is from 1 degree to 3 degrees. As yet another example, L is about (i.e. within 10%) of 30 degrees, and a is less than 4 degrees or greater than −4 degrees.

Figure 6:
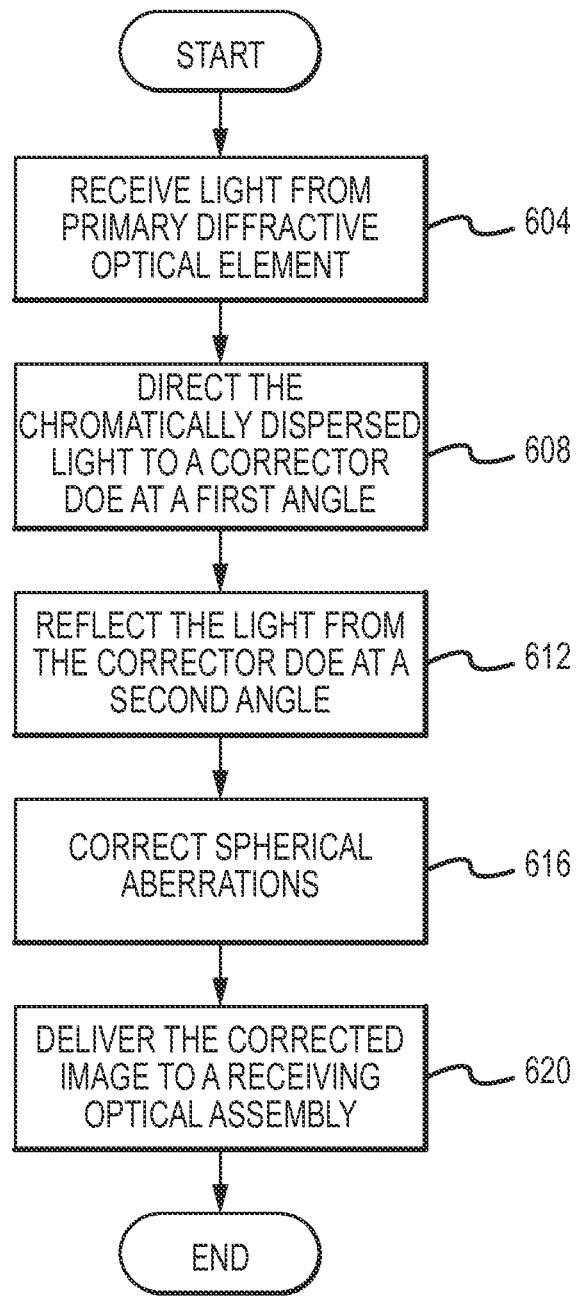
FIG. 6 depicts aspects of a method for correcting aberrations in an optical assembly in accordance with embodiments of the present disclosure.

FIG. 6 depicts aspects of a method for correcting chromatic aberrations in light received by a telescope 104 that includes a diffractive primary optical element 108. The method includes receiving light from the primary diffractive optical element 108 (step 604). The light received from the primary diffractive optical element is chromatically dispersed, and thus includes chromatic aberrations. Moreover, the light may encompass multiple integer numbers of diffraction orders. The chromatically dispersed light is directed to a corrector diffractive optical element 208 at a first angle.

In accordance with embodiments of the present disclosure, the first angle is relatively high, for example from about 25° to about 45° from a line normal to the surface of the corrector DOE 208 for a marginal ray, where about is ±10% (step 608). In accordance with further embodiments, the first angle is greater than 25° from a line normal to the surface of the corrector DOE 208 for the marginal ray. The corrector DOE 208 imparts a negative dispersion to the received light, reversing the chromatic dispersion therein. Where the received light contains multiple diffraction orders, correction includes providing a reverse diffractive power across all of the received diffraction orders. The correction at different diffraction orders is proportional to the wavelength at each diffraction order. By matching the negative dispersion of the corrector DOE 208 to the positive chromatic dispersion of the primary optical element 108 and/or other components within the optical train of the telescope 104, the chromatic dispersion can be nullified or greatly reduced.

At step 612, the now chromatically corrected light is reflected from the corrector DOE 208 at a second angle. In accordance with embodiments of the present disclosure, the corrective optic assembly 204 incorporates a Littrow configuration, in which the angle of incidence is about equal to the exit angle of light with respect to the surface of the corrector DOE 208. Accordingly, the second angle is relatively high. For example, the second angle may be within about +/−5° of the first angle. In accordance with further embodiments, the second angle is from 1° to 3° greater than the first angle. In accordance with still other embodiments, the second angle may be less than the first angle by 1° to 3°.

As can be appreciated by one of skill in the art after consideration of the present disclosure, the use of diffractive elements 108 and/or 208, alone or in combination with other optical elements, can create spherical aberrations in an image. Accordingly, at step 616, the spherical aberrations introduced in the optical train of the telescope 104 are removed. For example, corrective reflective and/or refractive optical elements can be incorporated to remove or reduce spherical aberrations. Although the step of correcting spherical aberrations is shown as being performed after the correction of chromatic aberrations, it should be appreciated that correction of the spherical aberrations can be made in advance of the introduction of such aberrations by the corrective DOE 208, to produce an image in which both chromatic and spherical aberrations are eliminated or reduced.

The corrected image is then delivered to a receiving optical assembly or device 236. For example, the receiving optical device 236 may comprise a focal plane array. Moreover, after receiving the image information, further corrections, modifications, or adjustments can be made in a digital domain. However, the need for such corrections with respect to at least chromatic aberrations can be eliminated or greatly reduced by embodiments of the present disclosure.

Although embodiments of a corrective optic assembly 204 have been discussed in connection with a telescope 104, and in particular in connection with a telescope 104 that may be deployed in orbit or in space, embodiments of the present disclosure are not so limited. For example, a corrective optical assembly 204 can be used in connection with any optical device in which modifications to or corrections of the chromatic dispersion of an optical signal are desirable.

The foregoing discussion of the invention has been presented for purposes of illustration and description. Further, the description is not intended to limit the invention to the form disclosed herein. Consequently, variations and modifications commensurate with the above teachings, within the skill or knowledge of the relevant art, are within the scope of the present invention. The embodiments described hereinabove are further intended to explain the best mode presently known of practicing the invention and to enable others skilled in the art to utilize the invention in such or in other embodiments and with various modifications required by the particular application or use of the invention. It is intended that the appended claims be construed to include alternative embodiments to the extent permitted by the prior art.

What is claimed is:

1. An optical system, comprising:
    a diffractive primary optical element;
    relay optics, wherein the relay optics include at least one of a first mirror and a first lens;
    a corrector diffractive optical element,
        wherein light that has been diffracted by the diffractive primary optical element is passed by the relay optics to the corrector diffractive optical element and is received at the corrector diffractive optical element at an incidence angle of at least 25 degrees from a line normal to a surface of the corrector diffractive optical element,
        wherein the corrector diffractive optical element is configured to reflect and diffract at least some of the light received at the corrector diffractive optical element,
        wherein an exit angle of the at least some of the light reflected and diffracted by the corrector diffractive optical element is at least 26 degrees from the line normal to the surface of the corrector diffractive optical element, and
        wherein at least some of the light reflected and diffracted by the corrector diffractive optical element is received at the relay optics.

2. The system of claim 1, wherein diffractive primary optical element is a transmissive element, and wherein the corrector diffractive optical element is configured to reflect and diffract the at least some of the light received at the corrector diffractive optical element with negative power and negative dispersion.

3. The system of claim 2, further comprising:
    an aft optical assembly, including:
        the relay optics,
            wherein the relay optics include a first concave mirror,
            wherein the relay optics further include a first convex mirror,
            wherein the first convex mirror is configured to reflect light diffracted by the diffractive primary optical element to the first concave mirror,
            wherein the first concave mirror is configured to reflect light received from the first convex mirror to the corrector diffractive optical element,
            wherein the light reflected and diffracted by the corrector diffractive optical element is reflected back to the first concave mirror, and
            wherein the first concave mirror is configured to reflect the light reflected and diffracted by the corrector diffractive optical element to the first convex mirror.

4. The system of claim 3, wherein the incidence angle of the light reflected from the first concave mirror to the corrector diffractive optical element is greater than the exit angle of the light reflected from the corrector diffractive optical element.

5. The system of claim 3, wherein the incidence angle of the light reflected from the first concave mirror to the corrector diffractive optical element is less than the exit angle of the light reflected from the corrector diffractive optical element.

6. The system of claim 4, wherein the corrector diffractive optical element, the first concave mirror, and the first convex mirror are disposed in a cylindrical Littrow configuration.

7. The system of claim 6, wherein the diffractive primary optical element includes a central obscuration, wherein the corrector diffractive optical element includes a central obscuration, and wherein the first convex mirror is located within the central obscuration.

8. The system of claim 7, wherein the aft optical assembly further includes:
    a second concave mirror;
    a second convex mirror,
        wherein the second concave mirror is configured to reflect light diffracted by the diffractive primary optical element to the second convex mirror, and
        wherein the second convex mirror is configured to reflect light received from the first convex mirror through a central obscuration in the second concave mirror, through a central obscuration in the first concave mirror, to the first convex mirror.

9. The system of claim 8, wherein the aft optical assembly further includes:
    a reimager assembly, wherein the first convex mirror is configured to reflect light that has been reflected and diffracted by the corrector diffractive optical element to the reimager assembly.

10. The system of claim 5, wherein the corrector diffractive optical element, the first concave mirror, and the first convex mirror are disposed in a cylindrical Littrow configuration.

11. The system of claim 10, wherein the diffractive primary optical element includes a central obscuration, wherein the corrector diffractive optical element includes a central obscuration, and wherein the first convex mirror is located within the central obscuration.

12. The system of claim 2, wherein the diffractive primary optical element is a transmissive element and diffracts light with a positive dispersion.

13. The system of claim 1, wherein the incidence angle of light received at the corrector diffractive optical element is between about 25 degrees and 45 degrees from a line normal to a surface of the corrector diffractive optical element, and wherein an exit angle of light reflected from the corrector diffractive optical element is from 1 degree to 3 degrees greater than the angle of incidence.

14. The system of claim 1, wherein the angle of incidence of light received at the corrector diffractive optical element is about 30 degrees from a line normal to a surface of the corrector diffractive optical element for a marginal ray, and wherein an exit angle of light reflected by the corrector diffractive optical element is from about 31 degrees to about 33 degrees from the line normal to the surface of the corrector diffractive optical element for the marginal ray.

15. A system for correcting chromatic aberrations, comprising:
    a convex mirror;
    a corrector diffractive optical element (DOE), wherein the convex mirror directs light to the corrector DOE such that an angle of incidence of a marginal ray of the light with respect to a line normal to a surface of the corrector DOE at a point of incidence is greater than 25 degrees, and wherein an exit angle of the marginal ray of the light with respect to the line normal to the surface of the corrector DOE is greater than 26 degrees.

16. The system of claim 15, wherein light is provided to the convex mirror by a primary DOE, wherein the primary DOE and the corrector DOE are blaze type multiple order diffraction gratings with multiple concentric patterns and with an integer number of diffraction orders, and wherein the corrector DOE provides proportional chromatically corrected bandwidths at each diffraction order.

17. A method for correcting chromatic aberrations, comprising:

receiving chromatically dispersed light;

directing the chromatically dispersed light to a corrector diffractive optical element (DOE) at a first angle, wherein the first angle is greater than 25 degrees from a line normal to a surface of the corrector DOE for a marginal ray;

reflecting the light from the corrector DOE at a second angle, wherein the second angle is about 25 degrees from the line normal to the surface of the corrector DOE for the marginal ray, wherein the corrector DOE has a negative chromatic dispersion power, and wherein the chromatic dispersion of the light reflected from the corrector DOE is reduced as compared to the light incident on the corrector DOE.

18. The method of claim 17, further comprising:

delivering the light reflected by the corrector DOE to a receiving optical assembly.

19. The method of claim 18, further comprising:

prior to delivering the light reflected by the corrector DOE to the receiving optical assembly, correcting spherical aberrations in the light.

20. The method of claim 19, wherein the second angle is within 1 degree to 3 degrees of the first angle.

* * * * *